United States Patent
Maruyama et al.

(10) Patent No.: US 11,209,285 B2
(45) Date of Patent: Dec. 28, 2021

(54) VEHICULAR DISPLAY DEVICE

(71) Applicant: NISSAN MOTOR CO., LTD., Kanagawa (JP)

(72) Inventors: Kenji Maruyama, Kanagawa (JP); Hiroshi Watanabe, Kanagawa (JP); Masayuki Shishido, Kanagawa (JP); Norio Kosaka, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 29 days.

(21) Appl. No.: 15/764,778

(22) PCT Filed: Sep. 30, 2015

(86) PCT No.: PCT/JP2015/077667
§ 371 (c)(1),
(2) Date: Mar. 29, 2018

(87) PCT Pub. No.: WO2017/056211
PCT Pub. Date: Apr. 6, 2017

(65) Prior Publication Data
US 2019/0041232 A1 Feb. 7, 2019

(51) Int. Cl.
*G01C 21/36* (2006.01)
*B60K 35/00* (2006.01)
(Continued)

(52) U.S. Cl.
CPC .......... *G01C 21/3632* (2013.01); *B60K 35/00* (2013.01); *G01C 21/365* (2013.01);
(Continued)

(58) Field of Classification Search
CPC .. G01C 21/3632; G01C 21/365; G01C 21/36; G01C 21/26; G09G 5/363;
(Continued)

(56) References Cited

U.S. PATENT DOCUMENTS 6,144,382 A * 11/2000 Hill ...................... G06F 3/04812
345/419
6,327,364 B1 * 12/2001 Shaffer ................... H04M 3/36
379/219
(Continued)

FOREIGN PATENT DOCUMENTS

CN 104827967 A 8/2015
JP 2007-225628 A 9/2007
(Continued)

OTHER PUBLICATIONS

David Scherer, The Visual Module of VPython-Reference Manual, p. 8. (Year: 2009).*
(Continued)

*Primary Examiner* — Jennifer Mehmood
*Assistant Examiner* — Kim Thanh T Tran
(74) *Attorney, Agent, or Firm* — Osha Bergman Watanabe & Burton LLP (57) ABSTRACT

A vehicular display device configured to display a guide route to a destination of a host vehicle includes a navigation device configured to calculate the guide route, a display controller configured to draw an arrow having a shaft with an arrowhead at one end of the shaft, as a guide figure for guidance along the guide route calculated by the navigation device, such that the arrow is shaped as a three-dimensional object in which one surface of the arrow is a continuous flat surface from the shaft to the arrowhead and the other surface of the arrow includes a first portion with a first width having a first height, and a second portion with a second width smaller than the first width and having a second height smaller than the first height, and a display configured to display an image drawn by the display controller in a display area.

13 Claims, 11 Drawing Sheets

(51) Int. Cl.
*G06T 19/00* (2011.01)
*G09G 5/36* (2006.01)

(52) U.S. Cl.
CPC ........... *G06T 19/006* (2013.01); *G09G 5/363* (2013.01); *G09G 2340/12* (2013.01); *G09G 2340/14* (2013.01); *G09G 2380/10* (2013.01)

(58) Field of Classification Search
CPC ........... G09G 2340/12; G09G 2380/10; G09G 2340/14; G06T 19/006; B60K 35/00
USPC .......................................................... 345/419
See application file for complete search history.

(56) References Cited

U.S. PATENT DOCUMENTS

| | | | | |
|---|---|---|---|---|
| 6,611,753 | B1* | 8/2003 | Millington | G01C 21/3632 340/988 |
| 6,883,145 | B2* | 4/2005 | Jaeger | G06F 3/0481 715/767 |
| 8,994,520 | B2 | 3/2015 | Stahlin et al. | |
| 9,678,341 | B2 | 6/2017 | Kim et al. | |
| 2003/0060971 | A1* | 3/2003 | Millington | G01C 21/3617 701/454 |
| 2008/0036776 | A1* | 2/2008 | Niles | G06F 3/04815 345/474 |
| 2009/0240426 | A1* | 9/2009 | Akita | G01C 21/3647 701/533 |
| 2010/0131190 | A1* | 5/2010 | Terauchi | G01C 21/3658 701/533 |
| 2010/0164702 | A1 | 7/2010 | Sasaki et al. | |
| 2010/0217515 | A1* | 8/2010 | Arai | G01C 21/3632 701/437 |
| 2012/0078043 | A1 | 3/2012 | Miyayashiki et al. | |
| 2012/0330659 | A1* | 12/2012 | Nakadai | G10L 21/06 704/235 |
| 2015/0226965 | A1 | 8/2015 | Kim et al. | |
| 2016/0328887 | A1* | 11/2016 | Elvezio | G06T 19/20 |

FOREIGN PATENT DOCUMENTS

| | | |
|---|---|---|
| JP | 2008-275948 A | 11/2008 |
| JP | 2010-156608 A | 7/2010 |
| JP | 4560090 B2 | 10/2010 |
| JP | 2012-110490 A | 6/2012 |
| JP | 2014-071627 A | 4/2014 |
| KR | 10-2009-0115044 A | 11/2009 |
| WO | 2007/142084 A1 | 12/2007 |
| WO | 2015/052312 A1 | 4/2015 |

OTHER PUBLICATIONS https://www.mathworks.com/matlabcentral/mlc-downloads/downloads/submissions/12274/versions/1/previews/arrow3D_pub/html/demoArrow3D.html (Year: 2006).*
https://tex.stackexchange.com/questions/225037/half-arrows-in-graph-using-tikz (Year: 2015).*

* cited by examiner

ARCH SHAPE

FIG. 8(b)

ENLARGED VIEW OF ARROW

FIG. 9(a)
RIDGE SHAPE

FIG. 9(b)

ENLARGED VIEW OF ARROW

FIG. 10(a)

COCKSCOMB SHAPE

VEHICULAR DISPLAY DEVICE

BACKGROUND

Technical Field

The present invention relates to a vehicular display device which displays information in a vehicle.

Related Art

As a conventional vehicular display device, there is known a display (Head-Up Display: HUD) device for augmented reality (AR) display which displays an image in a manner superimposed on an outside view ahead of a windshield (see Patent Literature 1). The display device displays guide figures along a guide route in a manner superimposed on a forward view in a traveling direction on a road on which a vehicle is traveling. For example, for route guidance and the like, the display device displays arrows indicating a course as if the arrows were drawn on the ground.

CITATION LIST

Patent Literature

Patent Literature 1: Japanese Patent No. 4560090

SUMMARY OF INVENTION

However, in Patent Literature 1, when the guide figure displayed on the road in the traveling direction is far from a host vehicle or extends horizontally, the guide figure is hard to read. In the case where the guide figure is an arrow, the guide figure is hard to read when a point where the arrow is laid is far or when the direction in which the arrow is pointing is horizontal or an oblique direction close to horizontal. This is because the arrow extending in the direction close to horizontal has a small vertical dimension as viewed from the driver.

If the arrow is drawn three-dimensionally, the arrow can have a sufficient vertical dimension and is easy to read even when the arrow extends in the direction close to horizontal. In the three-dimensionally-drawn arrow whose thickness is simply increased, the presence thereof can be easily recognized but distinguishability between a front end and a rear end of the arrow cannot be improved.

One or more embodiments of the present invention provides a vehicular display device which allows easy reading of a guide figure displayed on a road in a traveling direction.

A display controller draws an arrow having a shaft with an arrowhead at one end of the shaft, as a guide figure for guidance along a guide route calculated by a navigation device, such that the arrow looks like a three-dimensional object in which a portion of the arrow with a large width has a large height and a portion of the arrow with a small width has a small height. A display displays an image as drawn in a display area provided to overlap a position of a windshield.

DETAILED DESCRIPTION

A vehicular display device according to embodiments of the present invention is described below in detail with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
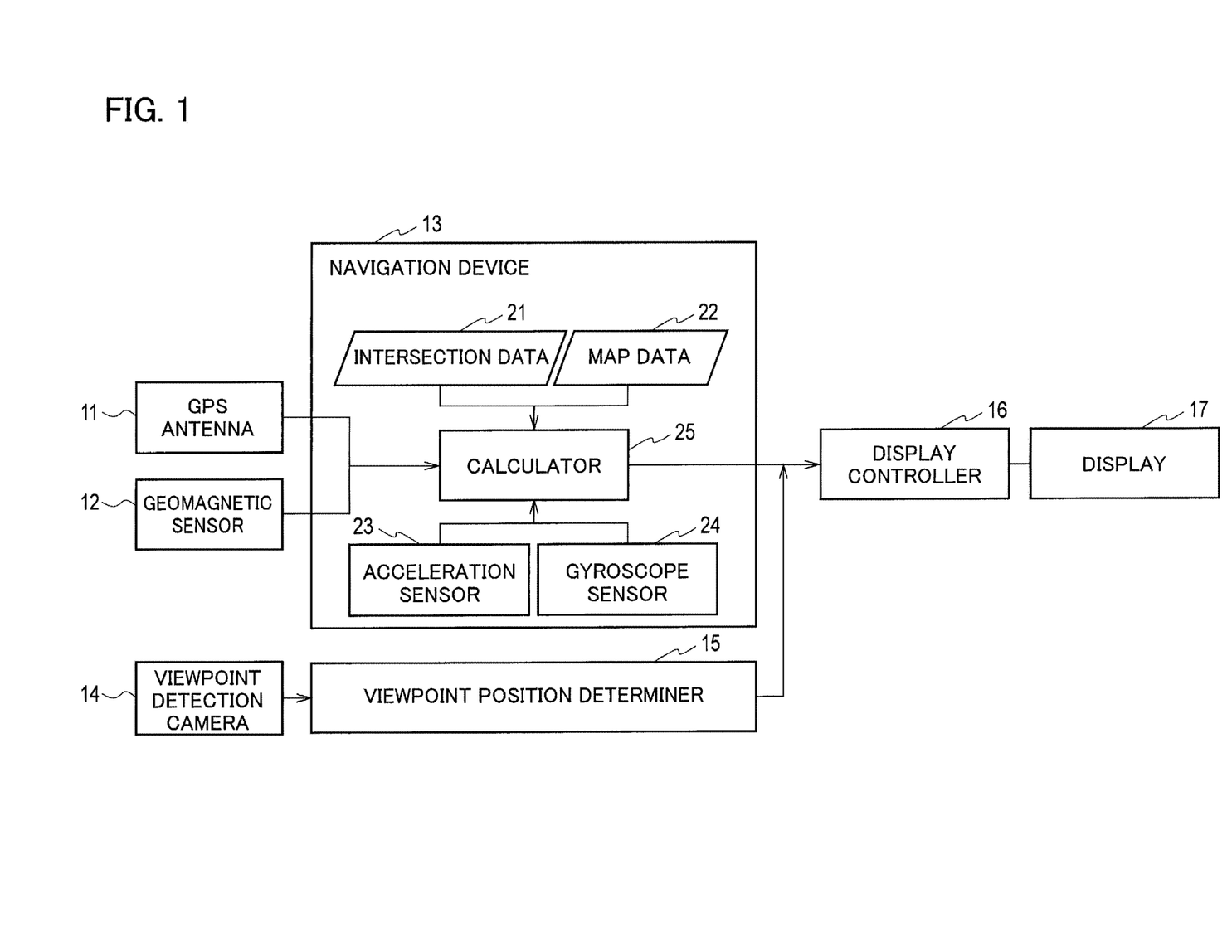
FIG. 1 is a block diagram illustrating a configuration of a vehicular display device according to one or more embodiments of the present invention.

FIG. 1 is a diagram illustrating a configuration of a vehicular display device according to one or more embodiments of the present invention. The vehicular display device displays a guide route to a destination of a host vehicle. The vehicular display device includes a GPS (Global Positioning System) antenna 11, a geomagnetic sensor 12, a navigation device 13, a viewpoint detection camera 14, a viewpoint position determiner 15, a display controller 16, and a display 17.

The GPS antenna 11 receives GPS signals from not-illustrated GPS satellites and outputs the received GPS signals to the navigation device 13 as GPS information. The geomagnetic sensor 12 detects azimuth of the direction in which the vehicle is facing (azimuth of the traveling direction of the vehicle) and outputs the detected azimuth to the navigation device 13 as azimuth information.

The navigation device 13 calculates the guide route by using the GPS information from the GPS antenna 11, the azimuth information from the geomagnetic sensor 12, and information acquired in itself. The navigation device 13 generates guidance route information for performing guidance along the calculated route and outputs the guide route information to the display controller 16. Details of the navigation device 13 are described later.

The viewpoint detection camera 14 captures an image including the positions of the eyes of a driver and outputs the captured image to the viewpoint position determiner 15 as viewpoint image information.

The viewpoint position determiner 15 determines a viewpoint position of the driver based on the viewpoint image information sent from the viewpoint detection camera 14 and outputs the determination result to the display controller 16 as viewpoint position information.

The display controller 16 generates an image to be displayed on the display 17 based on the guide route information and the like sent from the navigation device 13 and the viewpoint position information sent from the viewpoint position determiner 15. The display controller 16 draws arrows each having a shaft with an arrowhead at one end of the shaft, as guide figures for guidance along the guide route calculated by the navigation device 13, such that each arrow looks like a three-dimensional object in which a portion of the arrow with a large width has a large height and a portion of the arrow with a small width has a small height.

The display 17 includes a projection unit which projects a video, a screen and a Fresnel mirror which reflect the video, and the like, and displays an image in a display area provided to overlap the position of a windshield included in the vehicle. Particularly, the display 17 is a head-up display which can display the image in a manner superimposed on a forward view ahead of the vehicle by displaying the image reflected by a mirror, on a near side of the windshield as a virtual image. However, the display 17 is not limited to this type of head-up display. For example, the display 17 may be a combiner type head-up display using a transparent panel instead of displaying the image on the windshield or may employ a method of directly displaying the image on the windshield. In other words, the head-up display in one or more embodiments of the present invention may be any type as long as the driver can see the information, displayed by the head-up display in a manner superimposed on a view seen by the driver from the windshield, without looking down. The image based on the display image information generated by the display controller 16 is thereby displayed within the field of view of a person.

Next, the details of the aforementioned navigation device 13 are described. The navigation device 13 includes intersection data 21, map data 22, an acceleration sensor 23, a gyroscope sensor 24, and a calculator 25.

The intersection data 21 is data indicating characteristics and the like of each intersection and is acquired from, for example, a disc device or a center via a communication line and a communication device (both are not illustrated). The intersection data is read by the calculator 25.

The map data 22 is data acquired from, for example, the disc device or the center via the communication line and the communication device like the intersection data 21, and is used for drawing of a map, calculation of the guide route, generation of the guide route information to be outputted to the display controller 16, and the like. The map data 22 is read by the calculator 25.

The acceleration sensor 23 detects the acceleration of the host vehicle and outputs the detected acceleration to the calculator 25 as acceleration information.

The gyroscope sensor 24 detects the angular velocity of the host vehicle and outputs the detected angular velocity to the calculator 25 as angular velocity information.

The calculator 25 calculates the current position of the host vehicle by using the map data 22 and the GPS information sent from the GPS antenna 11. In the calculation, the vehicle sometimes cannot receive the GPS signals when traveling, for example, in a tunnel, under an elevated road, or between tall buildings. Accordingly, the calculator 25 calculates the current position by autonomous navigation based on the map data 22, the azimuth information from the geomagnetic sensor 12, the acceleration information from the acceleration sensor 23, and the angular velocity information from the gyroscope sensor 24. The calculator 25 creates the guide route information based on the calculated current position and outputs the created guide route information to the display controller 16.

Next, an operation of the vehicular display device according to one or more embodiments of the present invention configured as described above is described with reference to the flowchart illustrated in FIG. 2. Note that the vehicular display device creates arrows (route guide arrows) to be displayed to appear in a manner superimposed on a ground as illustrated in, for example, FIG. 3 for route guidance.

When the operation is started, a guidance flag is first acquired (step S11). Specifically, the display controller 16 acquires the guidance flag from the navigation device 13. Here, the guidance flag is a flag instructing whether to perform the guidance along the guide route or not. The guidance along the guide route using the arrows is performed only when the guidance flag is set to on.

Next, whether the guidance flag is on or not is checked (step S12). Specifically, the display controller 16 checks whether the guidance flag acquired in step S11 is on or not. When the guidance flag is determined not to be on in step S12, the display controller 16 determines that the guidance is unnecessary, and the processing is terminated.

Meanwhile, when the guidance flag is determined to be on in step S12, next, the guide route information is acquired (step S13). Specifically, the display controller 16 acquires the start position, the direction, and the length of each arrow from the navigation device 13 as the guide route information. The guide route information is calculated in advance depending on a route search operation performed by the driver and is stored in the navigation device 13.

Next, the viewpoint position is acquired (step S14). Specifically, the display controller 16 acquires the viewpoint position information from the viewpoint position determiner 15.

Then, arrangement of arrows drawn by lines in the display area is calculated (step S15). Specifically, the display controller 16 arranges arrows drawn by lines in a manner superimposed on the guide route as viewed from the driver, by using the guide route information acquired in step S13 and the viewpoint position acquired in step S14.

Next, three-dimensional looking arrows are drawn (step S16). Specifically, the display controller 16 draws arrows to be displayed in the display area by converting the arrows drawn by lines and arranged in the display area in step S15 to arrows looking three-dimensional as viewed from the viewpoint of the driver indicated by the viewpoint position information acquired in step S14. Steps of drawing the three-dimensional looking arrows are described in detail later.

Next, a display image is outputted to the display 17 (step S17). Specifically, the display controller 16 outputs the image drawn in step S16 to the display 17 as display image information. The display 17 thereby generates an image based on the display image information from the display controller 16, displays the generated image on a liquid crystal display or the like, and causes the image to be reflected on a mirror or the windshield to display the image directly within the field of view of a person. Thereafter, the sequence returns to step S12 and the aforementioned processes are repeated.

Figure 3:
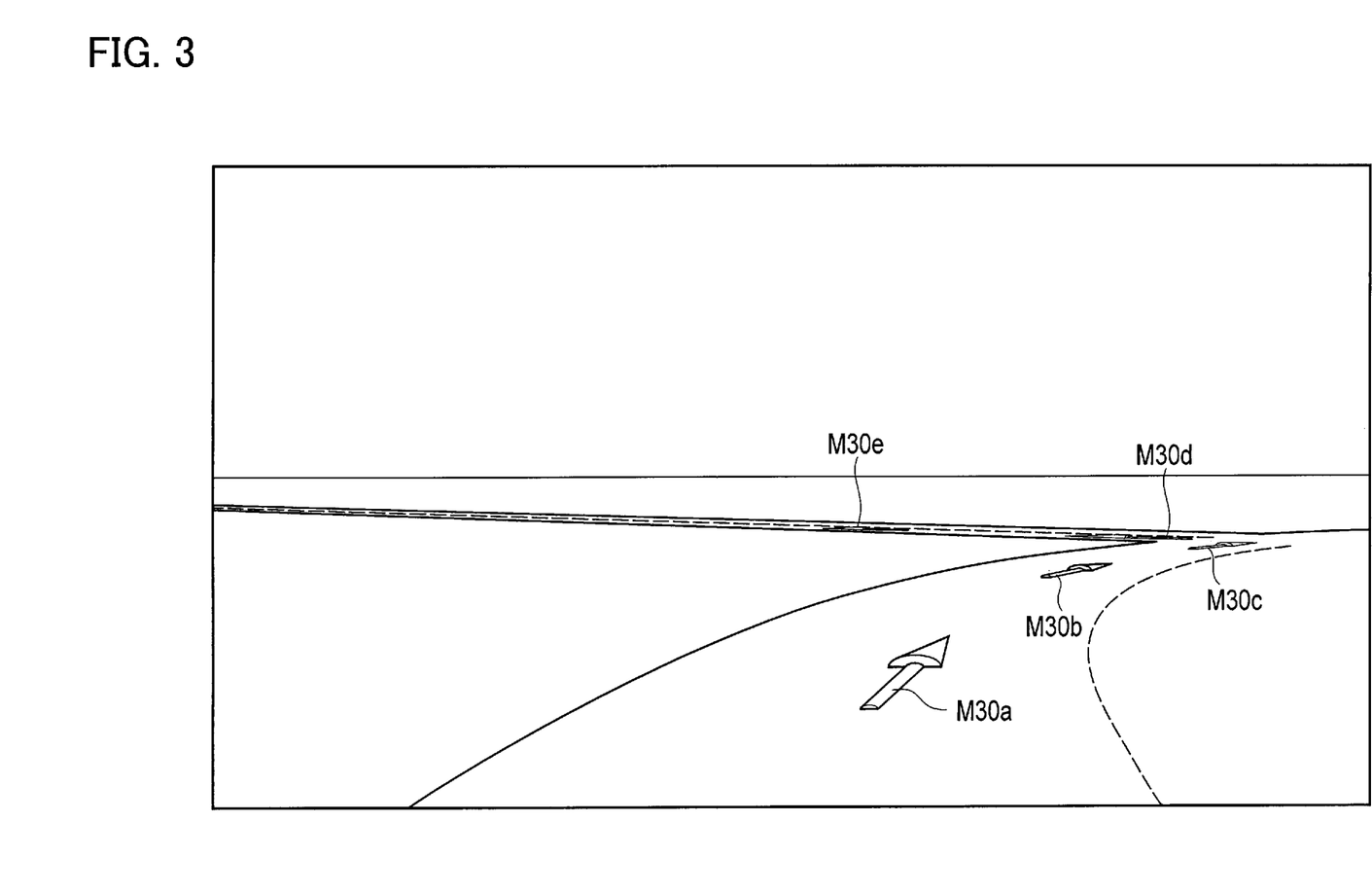
FIG. 3 is a view for explaining an example of arrows (route guide arrows) which are display targets in the vehicular display device according to one or more embodiments of the present invention.

Specifically, as illustrated in FIG. 3, three-dimensional looking arrows M30a, M30b, M30c, M30d, and M30e are displayed in a manner superimposed on the guide route in the display area provided to overlap an outside view ahead of the windshield.

Next, the steps of drawing each of the three-dimensional looking arrows are described.

Figure 4A:
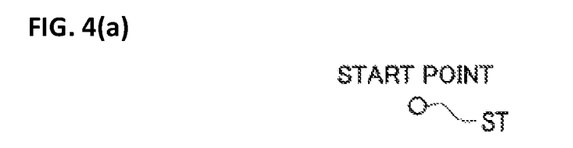
FIGS. 4(a)-(4d) illustrate steps of drawing three-dimensional looking arrows in the vehicular display device according to one or more embodiments of the present invention.
Figure 4B:
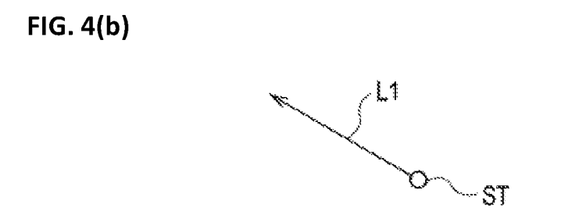

(1) First, as illustrated in FIG. 4(a), start point coordinates ST of an arrow are acquired from the navigation device 13.

(2) Then, as illustrated in part FIG. 4(a), information indicating the direction and length of the arrow L1 is acquired.

Figure 4C:
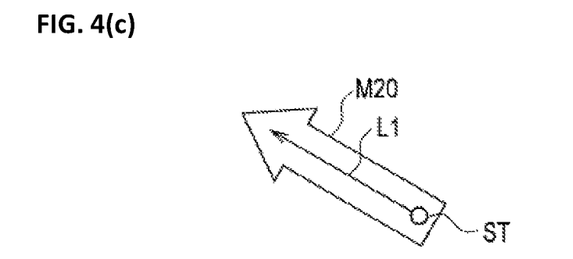

(3) Next, as illustrated in of FIG. 4(c), the thickness of the arrow L1 drawn by lines defined by the start point coordinates ST in (1) and the information indicating the direction and length in (2) is increased in a planar direction to create a two-dimensional arrow M20.

Figure 4D:
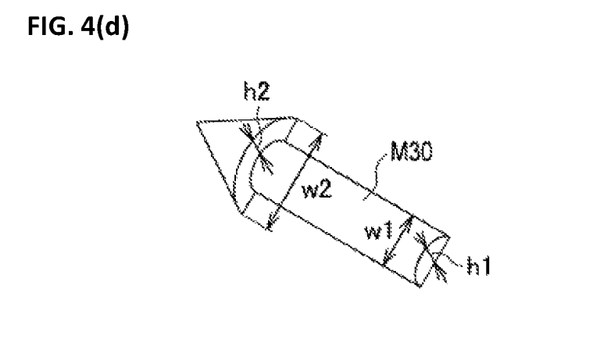

(4) Then, as illustrated in FIG. 4(d), the thickness of the two-dimensional arrow M20 created in (3) is increased to create a three-dimensional looking arrow M30. In this case, the arrow M30 is processed to look like a three-dimensional object in which a portion of the arrow M30 with a large width of w2 has a large height h2 and a portion of the arrow M30 with a small width of w1 has a small height h1.

Figure 5A:
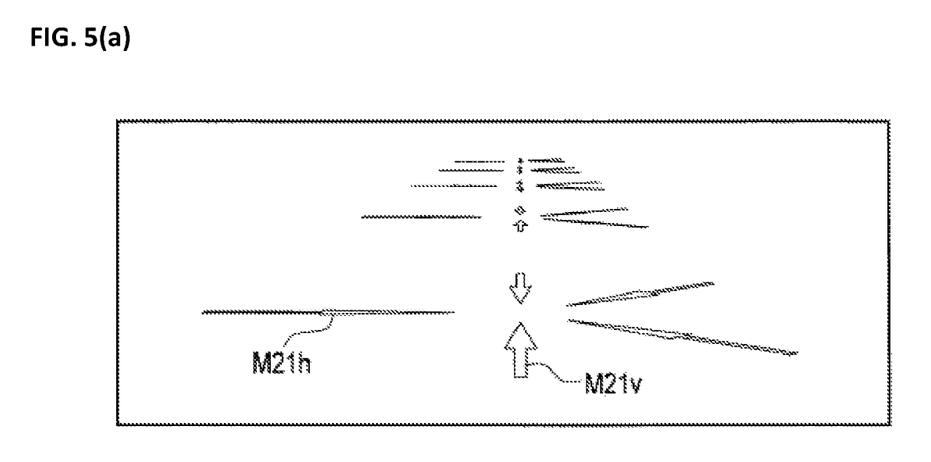
FIGS. 5(a)-5(b) illustrate a display example of arrows in comparative vehicular display device.
Figure 5B:
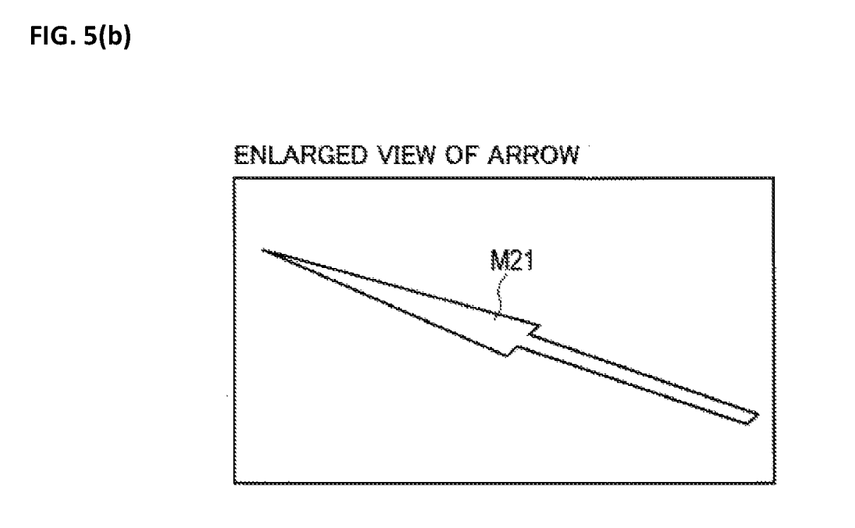

FIGS. 5(a) to 7(b) illustrate display examples of arrows in comparative vehicular display devices and, in each view, arrows of the same pattern (including multiple arrows) are drawn on the ground to be arranged in traveling directions of the vehicle. In the display of flat arrows drawn on the ground, as illustrated in FIGS. 5(a)-5(b), the larger the distance to an arrow M21 is, the smaller the arrow M21 is. Moreover, the distant arrows are viewed at angles close to an edge-on angle and a vertical arrow M21v has a small dimension and is hard to read. This is particularly significant for a horizontal arrow M21h.

Figure 6A:
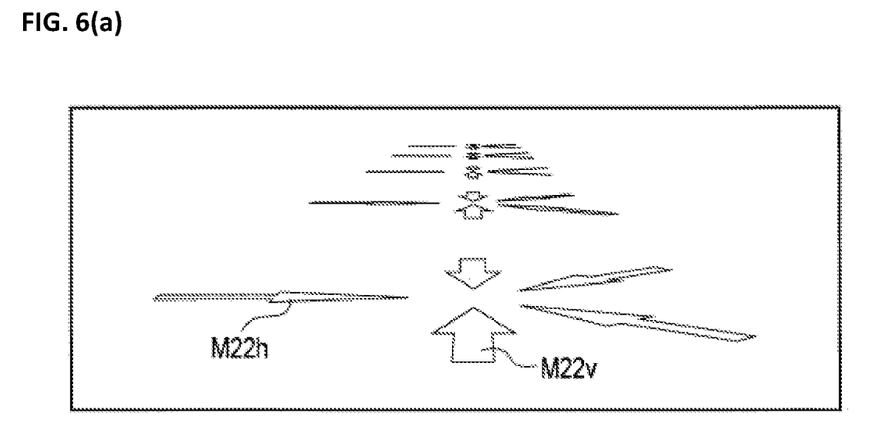
FIGS. 6(a)-6(b) illustrate another display example of arrows in a comparative vehicular display device.
Figure 6B:
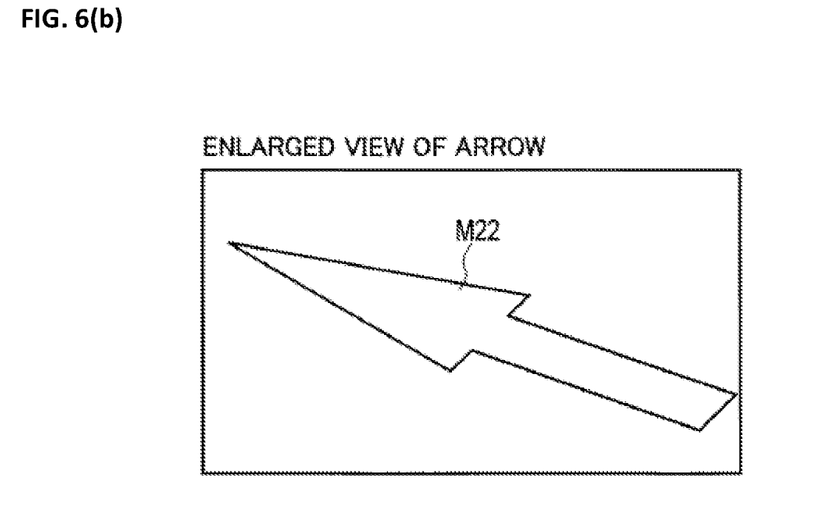
Figure 7A:
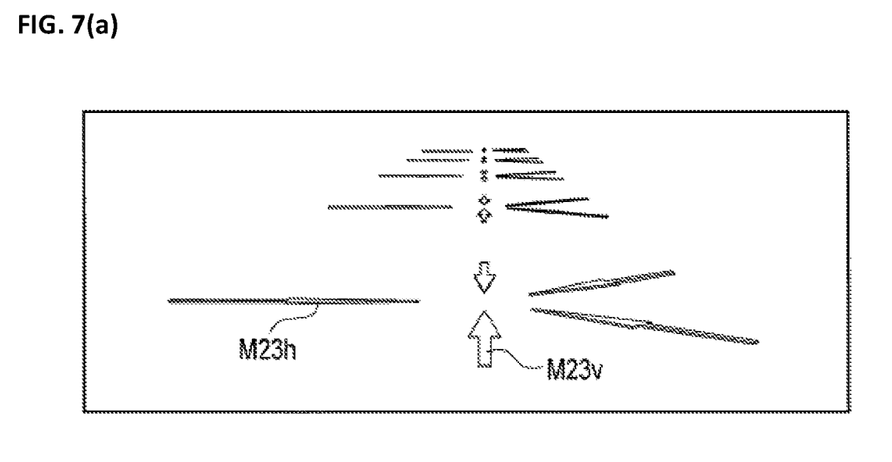
FIGS. 7(a)-7(b) illustrate yet another display example of arrows in a comparative vehicular display device.
Figure 7B:
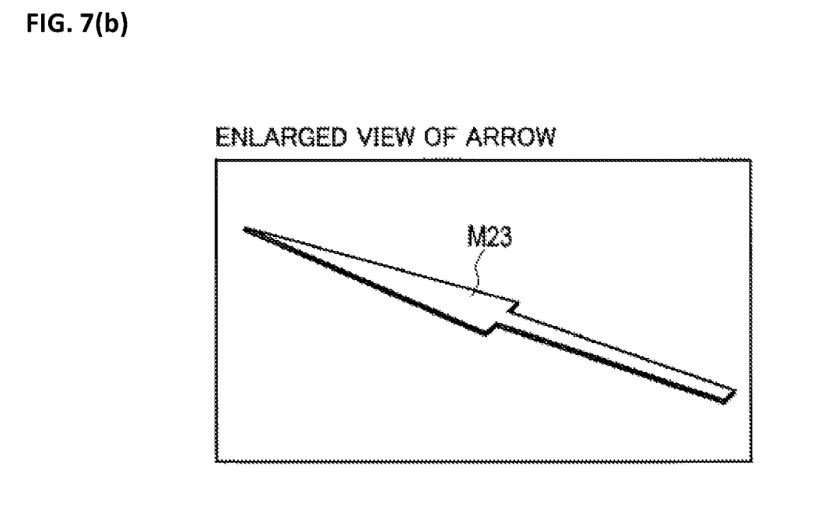

One may try to improve this by using arrows M22 each with an increased width as illustrated in FIGS. 6(a)-6(b). However, there is no significant improvement in readability. Moreover, arrows M23 which are three-dimensional objects each with a certain thickness can be used to improve the noticeability of distant horizontal arrows M23h. In this case, the distant horizontal arrows M23h are noticeable, but it is hard to read the direction in which each arrow is pointing.

Figure 8A:
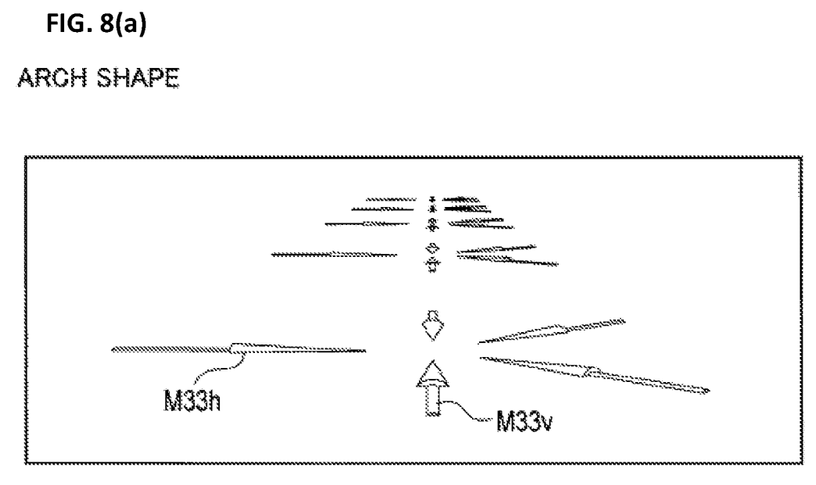
FIGS. 8(a)-8(b) illustrate a display example of arrows in the vehicular display device according to one or more embodiments of the present invention.
Figure 8B:
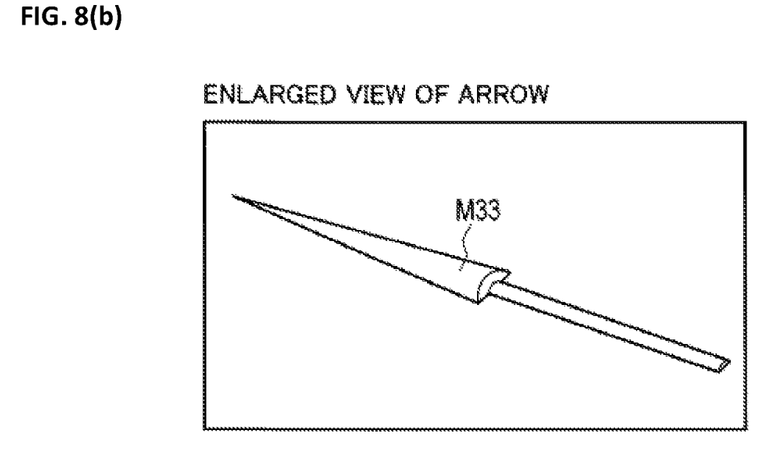

Meanwhile, in the vehicular display device according to one or more embodiments of the present invention, as illustrated in FIGS. 8(a)-8(b), since each of arrows M33 is displayed to look like a three-dimensional arch-shaped object in which a portion of the arrow with a large width has a large height and a portion of the arrow with a small width has a small height, the direction in which the arrow is pointing is easy to read. Moreover, since the shape of an arrowhead in each of distant horizontal arrows M33h is easy to read, the direction in which the arrow is pointing is easy to read.

Figure 9A:
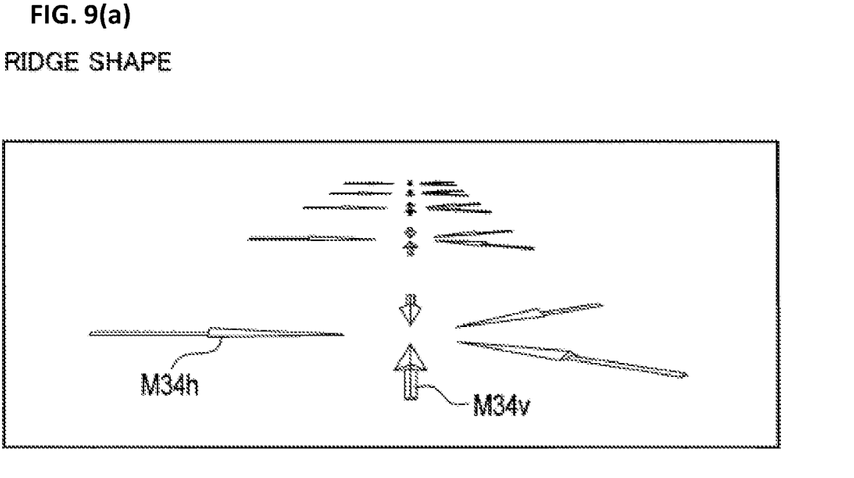
FIGS. 9(a)-9(b) illustrate another display example of arrows in the vehicular display device according to one or more embodiments of the present invention.
Figure 9B:
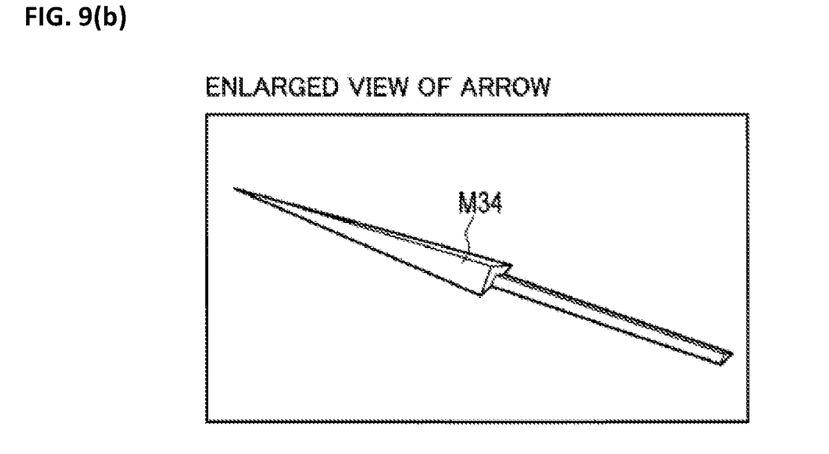
Figure 10A:
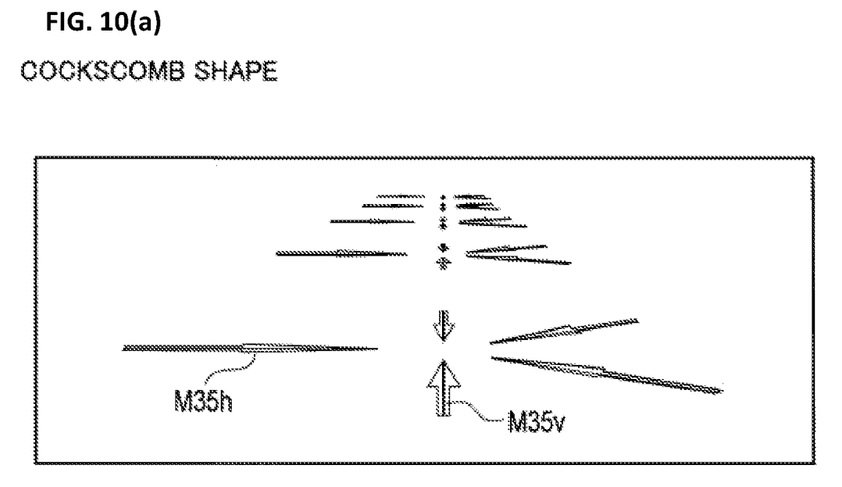
FIGS. 10(a)-10(b) illustrate yet another display example of arrows in the vehicular display device according to one or more embodiments of the present invention.
Figure 10B:
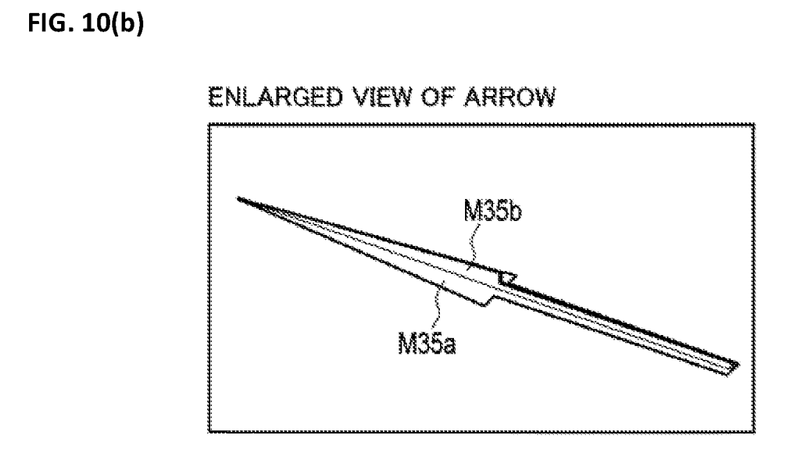

Although the arrows are drawn in the three-dimensional arch shape which is raised in the center portion in the width direction as in the example illustrated in FIGS. 8(a)-8(b), the arrows may be drawn like arrows M34 with a three-dimensional ridge shape which is bent at the center in the width direction as illustrated in FIGS. 9(a)-9(b). Moreover, as illustrated in FIGS. 10(a)-10(b), the arrows may be each drawn to look like a three-dimensional cockscomb-shaped object whose height changes only in a center portion M35b in the width direction.

A configuration of a vehicular display device according to one or more embodiments of the present invention described below is similar to the configuration of the vehicular display device illustrated in FIG. 1, but is different in the shape of the arrows displayed in the display 17. Accordingly, description is given below mainly of portions different from the above embodiments.

In some cases, the navigation device 13 sends the display controller 16 a line configured by a straight line and a curved line as one mode of the guide route information.

Next, an operation of the vehicular display device according to one or more embodiments of the present invention is described with reference to the flowchart illustrated in FIG. 2 used for the description of the operation in the vehicular display device according to one or more of the above embodiments.

Figure 2:
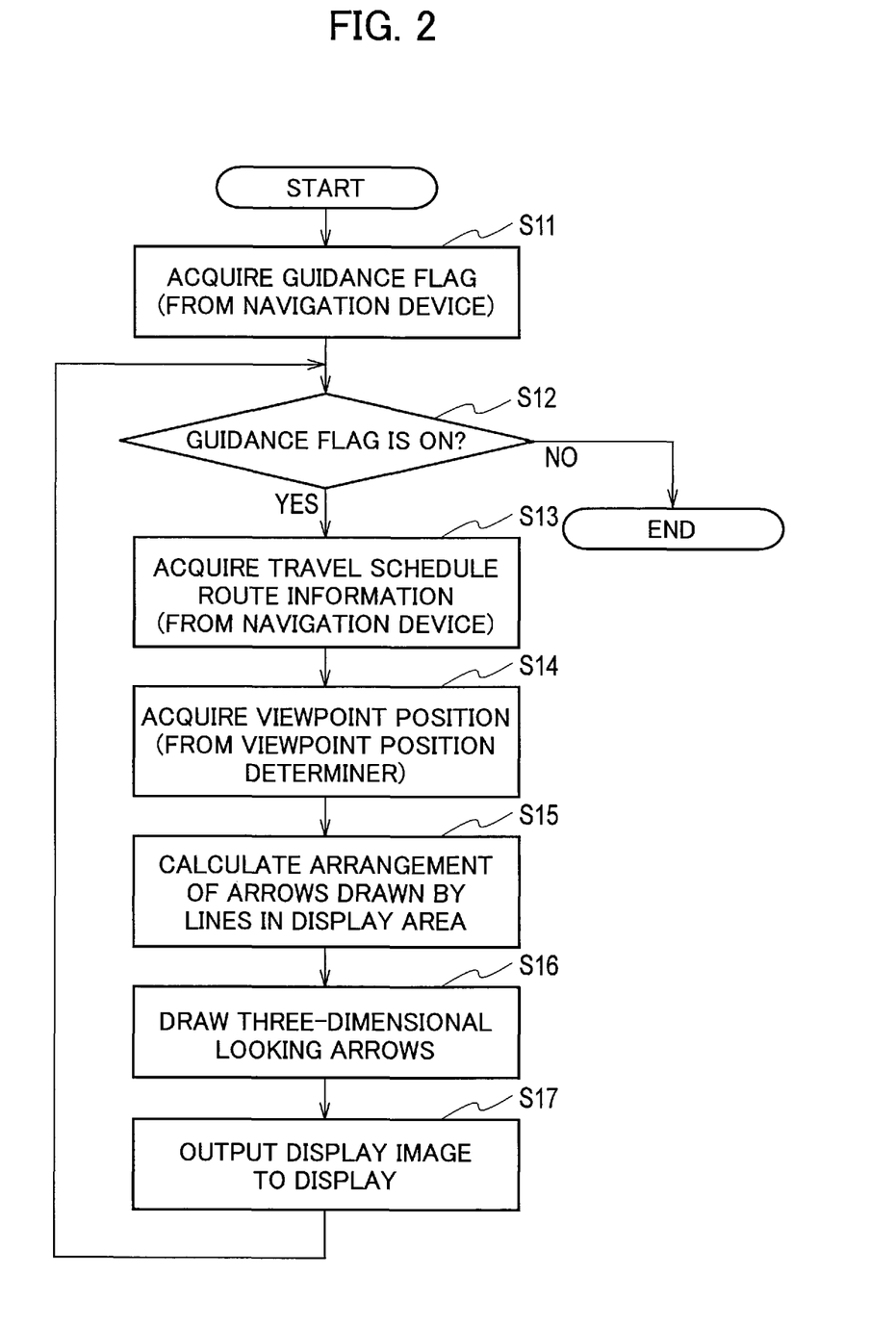
FIG. 2 is a flowchart for explaining an operation of the vehicular display device according to one or more embodiments of the present invention.

Since processes in step S11 to S12 are the same as those in the flowchart illustrated in FIG. 2, description thereof is omitted.

In step S13, assume that the guide route indicated by the guide route information acquired from the navigation device 13 indicates "left turn" at the next intersection. In this case, the display controller 16 acquires a guide route curved to the left from the navigation device 13.

Next, the viewpoint position is acquired (step S14). Specifically, the display controller 16 acquires the viewpoint position information from the viewpoint position determiner 15.

Then, arrangement of an arrow drawn by lines in the display area is calculated (step S15). Specifically, the display controller 16 arranges a curved arrow drawn by lines in a manner superimposed on the guide route as viewed from the driver, by using the information on the guide route curved to the left which is acquired in step S13 and the viewpoint position which is acquired in step S14.

Next, the arrow is drawn to look three-dimensional (step S16). Then, the display image is outputted to the display (step S17). The display 17 thereby generates an image based on the display image information from the display controller 16, displays the generated image on the liquid crystal display or the like, and causes the image to be reflected on the mirror or the windshield to display the image directly within the field of view of a person. Thereafter, the sequence returns to step S12 and the aforementioned processes are repeated.

Figure 11A:
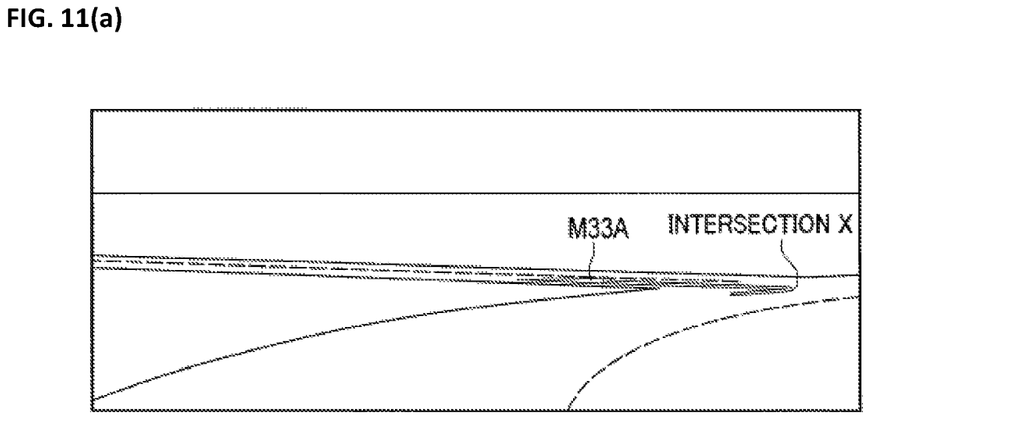
FIGS. 11(a)-11(b) illustrate a display example of arrows in a vehicular display device according to one or more embodiments of the present invention.
Figure 11B:
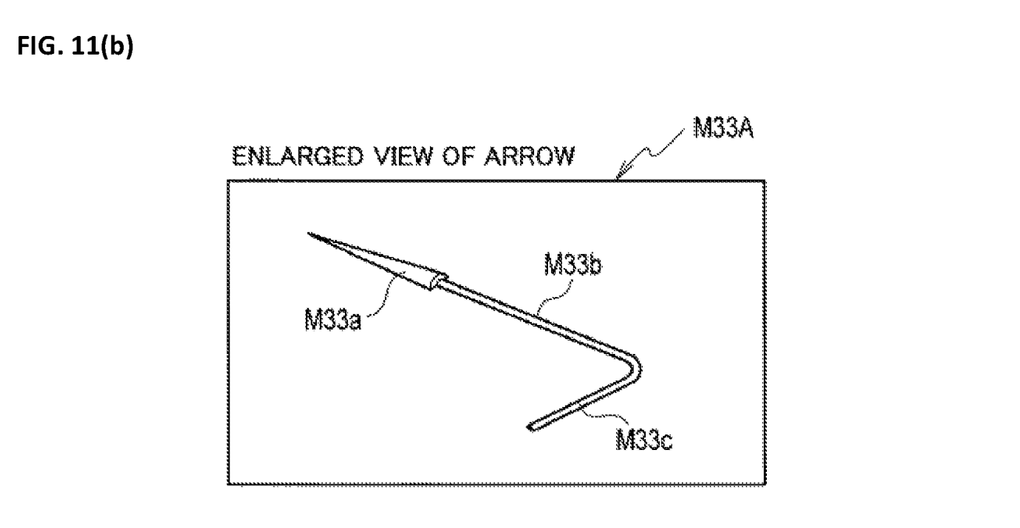

By the aforementioned operation, the display 17 displays an arrow instructing a left turn at the next intersection, for example, an arrow M33A having a shaft curved to the left as illustrated in FIGS. 11(a)-11(b). The arrow M33A is configured by an arrow M33a having a shape of an arrowhead, a linear arrow M33b connected to the arrow M33a, and an arrow M33c bent relative to the arrow M33b.

In the vehicular display device according to one or more embodiments of the present invention, since the arrow used for guidance in an intersection is displayed as an arrow looking like a three-dimensional arch-shaped object in which a portion of the arrow with a large width has a large height and a portion of the arrow with a small width has a small height, the direction in which the arrow is pointing is easy to read. Moreover, since the shape of the arrowhead in the distant horizontal arrow is easy to read, the direction in which the arrow is pointing is easy to read.

Note that, in the example illustrated in FIGS. 11(a)-11(b), although the arrow is drawn to look like the three-dimensional arch-shaped object, the arrow may be drawn to look like a three-dimensional ridge-shaped object which is bent at the center in the width direction as in one or more of the above embodiments. Moreover, the arrow may be drawn to look like a three-dimensional cockscomb-shaped object whose height changes only in a center portion in the width direction.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

11 GPS antenna
12 geomagnetic sensor
13 navigation device
14 viewpoint detection camera
15 viewpoint position determiner
16 display controller
17 display
21 intersection data
22 map data
23 acceleration sensor
24 gyroscope sensor
25 calculator

The invention claimed is:

1. A vehicular display device configured to display a guide route to a destination of a host vehicle, the vehicular display device comprising:
a navigation device configured to calculate the guide route;
a display controller configured to acquire the guide route from the navigation device and draw an arrow based on the guide route,
wherein the guide route includes a start position, a direction, and a length of the arrow,
wherein the arrow has a shaft with an arrowhead at one end of the shaft and a three-dimensional shape with one or more dimensions calculated based on the guide route,
wherein one surface of the arrow is a continuous flat surface from the shaft to the arrowhead and an other surface of the arrow includes a larger width portion having a larger height and a smaller width portion having a smaller height; and
a display configured to display an image drawn by the display controller in a display area provided to overlap a position of a windshield,
wherein the display controller is configured to calculate, based on the guide route, an arrangement of the arrow drawn by lines superimposed on the guide route, convert the arrangement to draw the arrow in the three-dimensional shape, and display the arrow such that the one surface appears to be superimposed on a ground.

2. The vehicular display device according to claim 1, wherein the display controller is configured to draw the arrow in a three-dimensional arch shape where, within both the shaft and the arrowhead, a height of the arrow decreases in a curved line from a center of the arrow in the width direction towards both edges of the arrow.

3. A vehicular display device configured to display a guide route to a destination of a host vehicle, the vehicular display device comprising:
a navigation device configured to calculate the guide route;
a display controller configured to acquire the guide route from the navigation device and draw an arrow based on the guide route,
wherein the guide route includes a start position, a direction, and a length of the arrow,
wherein the arrow has a shaft with an arrowhead at one end of the shaft and a three-dimensional shape with one or more dimensions calculated based on the guide route,
wherein one surface of the arrow is a continuous flat surface from the shaft to the arrowhead and an other surface of the arrow includes a larger width portion having a larger height and a smaller width portion having a smaller height; and
a display configured to display an image drawn by the display controller in a display area provided to overlap a position of a windshield,
wherein the display controller is configured to calculate, based on the guide route, an arrangement of the arrow drawn by lines superimposed on the guide route and convert the arrangement to draw the arrow in a three-dimensional ridge shape where, within both the shaft and the arrowhead, a height of the arrow decreases linearly from a center of the arrow in the width direction towards both edges of the arrow in the width direction.

4. A vehicular display device configured to display a guide route to a destination of a host vehicle, the vehicular display device comprising:
a navigation device configured to calculate the guide route;
a display controller configured to acquire the guide route from the navigation device and draw an arrow based on the guide route,
wherein the guide route includes a start position, a direction, and a length of the arrow,
wherein the arrow has a shaft with an arrowhead at one end of the shaft and a three-dimensional shape with one or more dimensions calculated based on the guide route,
wherein one surface of the arrow is a continuous flat surface from the shaft to the arrowhead and an other surface of the arrow includes a larger width portion having a larger height and a smaller width portion having a smaller height; and
a display configured to display an image drawn by the display controller in a display area provided to overlap a position of a windshield,
wherein the display controller is configured to calculate, based on the guide route, an arrangement of the arrow drawn by lines superimposed on the guide route and convert the arrangement to draw the arrow in a three-dimensional cockscomb shape, where, within both the shaft and the arrowhead, a line along a center of the arrow in the width direction is protruded to a height of the arrow while, away from the center of the arrow in the width direction, the height is constant.

5. The vehicular display device according to claim 1, wherein the width of the shaft is constant in the continuous flat surface.

6. The vehicular display device according to claim 3, wherein the width of the shaft is constant in the continuous flat surface.

7. The vehicular display device according to claim 4, wherein the width of the shaft is constant in the continuous flat surface.

8. The vehicular display device according to claim 1, wherein, when viewed orthogonally to the continuous flat surface, the arrowhead is triangular and the shaft is rectangular.

9. The vehicular display device according to claim 1, wherein, in the continuous flat surface, the arrowhead is triangular and the shaft is rectangular.

10. The vehicular display device according to claim 3, wherein, when viewed orthogonally to the continuous flat surface, the arrowhead is triangular and the shaft is rectangular.

11. The vehicular display device according to claim 3, wherein, in the continuous flat surface, the arrowhead is triangular and the shaft is rectangular.

12. The vehicular display device according to claim 4, wherein, when viewed orthogonally to the continuous flat surface, the arrowhead is triangular and the shaft is rectangular.

13. The vehicular display device according to claim 4, wherein, in the continuous flat surface, the arrowhead is triangular and the shaft is rectangular.

\* \* \* \* \*